United States Patent [19]

Bruce

[11] E Re. 28,746

[45] Reissued Mar. 30, 1976

[54] CHAIN CABLE

[76] Inventor: Peter Bruce, 10 Torphichen Place, Edinburgh, EH3 8DU, Scotland

[22] Filed: Apr. 21, 1975

[21] Appl. No.: 569,594

Related U.S. Patent Documents

Reissue of:

[64] Patent No.: 3,810,358
Issued: May 14, 1974
Appl. No.: 190,192
Filed: Oct. 18, 1971

[30] Foreign Application Priority Data

Oct. 20, 1970 United Kingdom ..... 49665/70

[52] U.S. Cl. ..... 59/78; 59/84
[51] Int. Cl.[2] ..... F16G 13/12
[58] Field of Search ..... 59/78, 84, 90, 91, 80, 59/82, 85, 86; 64/2 R, 2 P

[56] References Cited

UNITED STATES PATENTS

| | | | |
|---|---|---|---|
| 620,914 | 3/1899 | Griffith | 59/86 |
| 1,517,346 | 12/1924 | Crandall | 59/86 |
| 3,526,394 | 9/1970 | Howell | 59/86 |
| 3,662,539 | 5/1972 | Florjancic | 59/84 |

FOREIGN PATENTS OR APPLICATIONS

| | | | |
|---|---|---|---|
| 181,463 | 6/1922 | United Kingdom | 64/2 P |
| 1,060,261 | 3/1967 | United Kingdom | 59/78 |

*Primary Examiner*—C. W. Lanham
*Assistant Examiner*—Gene P. Crosby

[57] ABSTRACT

A chain cable in which each link is characterised by being formed from a bar [ bent into a ] *of* U-shape bridged at the extremities by a cylindrical pin of length substantially equal to its diameter which mates under load with the U-shaped bar of a next adjacent link to give a substantial bearing area between links so that bearing failure may be eliminated as a first-occurring manner of failure of the chain cable when it is subjected to a tensile load.

5 Claims, 4 Drawing Figures

Peter Bruce.

CHAIN CABLE

Matter enclosed in heavy brackets [ ] appears in the original patent but forms no part of this reissue specification; matter printed in italics indicates the additions made by reissue.

The present invention relates to chain cable, for example: chain cable as used for mooring ships, floating drilling rigs, barges, and the like.

In the past, heavy chain cables, such as used for mooring ships, have been fabricated from round section bar forming links wherein each link has had three orthogonal modes of rotational freedom with respect to a next adjacent mating link. Generally, each link is formed from round section bar bent and welded to form a closed oval loop which may be braced across a minor diameter by a strut known as a "stud." A joined sequence of such links in standard lengths coupled by special joining links comprises conventional chain cable.

A disadvantage of such chain cable lies in the fact that, owing to the linking of curved round-section bars, only point contact initially occurs between links bearing one against the other when the cable is in tension under the action of a load. This point contact gives rise to enormous bearing pressure between links, even under relatively light loading, which causes the metal of the link to fail locally in bearing and be extruded away form the high pressure locality until the bearing area has increased sufficiently to carry the applied load. As the tensile load in the cable increases, bearing failure occurs again and metal is extruded from the bearing zone progressively until the cross-sectional area of the round section bar of the link is so reduced in the region of bearing failure that terminal shear failure occurs and the cable parts suddenly.

Failure in bearing thus constitutes the first-occurring manner of failure in present day stud-link chain cable and, coupled with consequentially precipitated failure in shear, commonly results in chain cable failing at less than half the tensile load capacity of the material from which the cable is formed.

An object of the present invention is to provide a chain cable which does not have bearing failure as the first-occurring manner of failure and which provides high strength relative to the weight of material in the cable.

According to the present invention, a chain cable comprises a plurality of links, joined together in sequence, characterized in that each link includes a bar member [bent into a] *of* U-shape and a cylindrical pin member bridging the inside surfaces of the extremities of the bar member and attached thereto such that under load the curved inside surface of the U-shaped bent bar member of a next adjacent link mates against a surface of the pin member whereby the pin member is restrained to have only one mode of rotational freedom relative to the said next adjacent link, the radius of curvature of the cylindrical mating surface of the pin member being substantially equal to half the distance separating the inside surfaces of the extremities of the bar member.

Preferably the cross-sectional area of the pin member is at least equal to the least cross-sectional area of a limb of the U-shaped bar member so that the shear stress in the pin member does not exceed the tensile stress in the bar member.

Preferably the bar member is of rectangular cross-section.

Preferably the pin member is a hollow circular cylinder.

Preferably where the pin member is a hollow circular cylinder, the internal diameter of the pin member is substantially equal to 0.707 times its external diameter.

Preferably the overall length of a link of the chain cable lies in the range 4 to 6.5 times the external diameter of the link pin.

Embodiments of the present invention will now be described by way of example with reference to the accompanying drawings in which.

Figure 1:
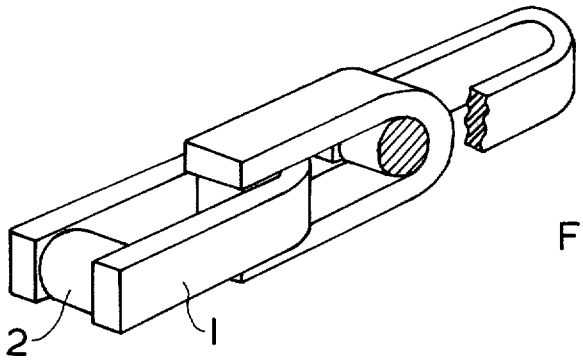
FIG. 1 shows a sectioned perspective view of a three-link sample of the chain cable.

Referring to FIG. 1, a chain cable includes a number of similar links each comprising a length of rectangular cross-section bar 1 bent into a U-shape with parallel limbs joined at their extremities by a circular cylindrical pin 2. The radius of curvature of the inner surface of bar 1 remote from pin 2 equals or just slightly exceeds half the width of bar 1 measured parallel to the axis of curvature. Pin 2 is welded in position and has a diameter equal to its length which, in turn, is equal to the distance separating the opposed inner surfaces of the extremities of bar 1.

Each link encircles the pin of the next adjacent link such that, when under tension, the curved inner surfaces of bars 1 mate against the surfaces of pins 2 whereby each link is restrained to one mode of rotational freedom relative to a next adjacent link and whereby a bearing area equal to the square of the pin diameter is obtained when measured as projected on a plane orthogonal to the axis of the chain cable.

The cross-sectional area of pin 2 measured across its axis is at least 10 per cent greater than the cross-sectional area of a limb of bar 1 and the said width of bar 1 so that the shear stress in the pin is always appreciably less than the tensile stress in the bar for a given tension of the cable and is just sufficiently less than the diameter and length of pin 2 to allow bar 1 to swing freely within the limbs of the corresponding bar 1 of the next adjacent link. The overall length of each link lies typically in the range 4 to 6.5 times the diameter of pin 2.

In a length of chain cable formed by a number of joined links constructed as described, each link is angularly orientated at right angles to the previous link. The cable thus can form curves in two planes at right angles to each other but, owing to the constraint of each link pin to one mode of rotational freedom, the cable remains rigid in torsion.

Figure 2:
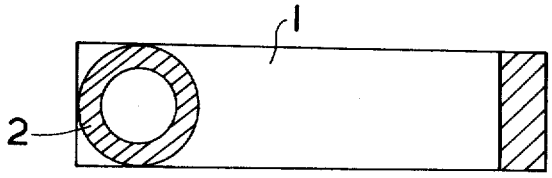
FIG. 2 shows a sectional side elevation of a link of the chain cable having a hollow pin.
Figure 3:
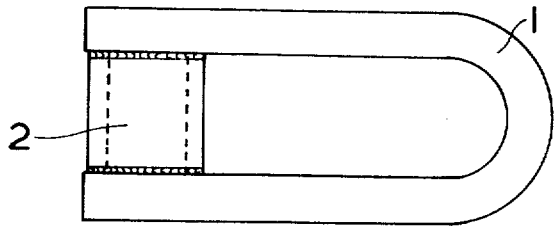
FIG. 3 shows a plan view of the link shown in FIG. 2.

Referring to FIGS. 2 and 3, in a preferred embodiment of the present invention, pin 2 is shown hollow and having an internal bore co-axial with the pin axis. The internal diameter of the hollow pin 2 is equal to 0.707 times the external diameter so that the cross-sectional area of the bore equals the cross-sectional area of the material of the hollow pin.

Figure 4:
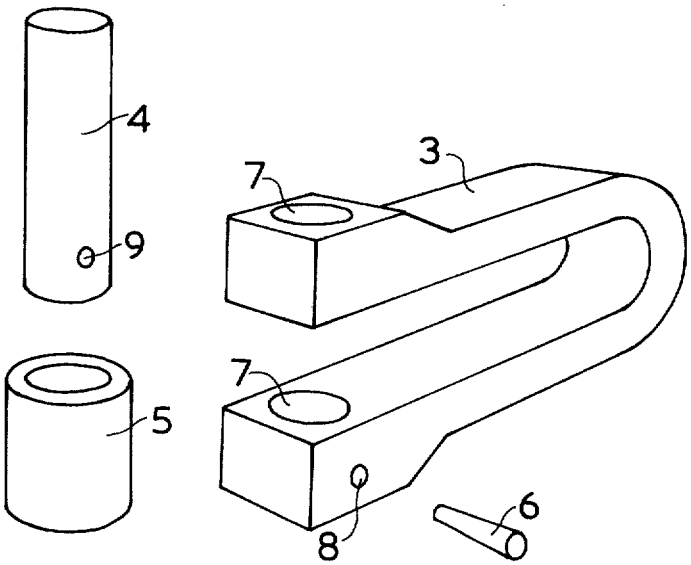
FIG. 4 shows an exploded perspective view of a special joining link for joining lengths of chain cable formed of links as shown in FIGS. 2 and 3.

Referring to FIG. 4, a modification of the preferred embodiment of FIGS. 2 and 3 is shown which forms a joining link for joining lengths of cable together and which comprises a U-shaped bar 3, a cylindrical pin 4, a tubular sleeve 5, and a taper pin 6. The U-shaped bar 3 is similar to the previous bar 1 but has an increased depth of section at the extremities of its limbs. These deepened extremities carry co-axial bore holes 7 through which may be fitted the cylindrical pin 4. The tubular sleeve 5 is dimensionally identical to the hollow link pin 2 shown in FIGS. 2 and 3 and is removably located in the link pin position of bar 3 by passing pin 4 through sleeve 5 and bore holes 7. Pin 4 has a cross-sectional area equal to that of the bore of sleeve 5 and is locked in position by a taper pin 6 locating in hole 8 in bar 3 and in hole 9 in pin 4.

Joining of two cable lengths formed of hollow pin links is effected by assembling a joining link, as shown in FIG. 4, through an end link of each cable length. The joining link has equal strength with that of a common hollow pin link so that no weak link is present in the cable formed from the two joined lengths of chain. Where twisting forces must be accommodated, a swivel piece can be included between lengths of the cable.

A chain cable, constructed as hereinbefore described, can provide a considerably higher tensile strength relative to the weight of material in the cable than that of conventional cable with links formed from round section bars.

I claim:

1. A chain cable comprising a plurality of links, joined together in sequence, characterised in that each link includes a uniform bar member [ bent into a] *of* U-shape and a cylindrical pin member bridging the inside surfaces of the extremities of the bar member and attached *integrally* thereto [ by welding] such that under load the curved inside surface of the [bent] U-shaped bar member of a next adjacent link mates against a surface of the pin member whereby the pin member is restrained to have only one mode of rotational freedom relative to the next adjacent link, the radius of curvature of the cylindrical mating surface of the pin member being substantially equal to half the distance separating the inside surfaces of the extremities of the bar member and the cross-sectional area of the material of the pin member being not less than 1.1 times the cross-sectional area of a limb of the uniform bar member.

2. A chain cable, as claimed in claim 1, characterised in that the bar member of each link is of rectangular cross-section.

3. A chain cable, as claimed in claim 1, characterized in that the pin member of each link is a hollow circular cylinder.

4. A chain cable, as claimed in claim 3, characterised in that the hollow pin member of each link has an internal bore diameter substantially equal to 0.707 times its external diameter.

5. A chain cable, as claimed in claim 1, characterized in that the overall length of each link lies in the range 4 to 6.5 times the external diameter of the pin of each link.

* * * * *